United States Patent [19]
Hudson et al.

[11] Patent Number: 6,042,211
[45] Date of Patent: Mar. 28, 2000

[54] INK DROP VOLUME VARIANCE COMPENSATION FOR INKJET PRINTING

[75] Inventors: Kevin R. Hudson, Camas; Philip B Cowan, Vancouver; Jay S Gondek, Camas, all of Wash.

[73] Assignee: Hewlett-Packard Company, Fort Collins, Colo.

[21] Appl. No.: 08/978,040

[22] Filed: Nov. 25, 1997

[51] Int. Cl.[7] .................................................. B41J 2/205
[52] U.S. Cl. .............................................................. 347/15
[58] Field of Search ................................. 347/15, 19, 43; 358/298, 456, 534

[56] References Cited

U.S. PATENT DOCUMENTS

| | | | |
|---|---|---|---|
| 4,499,479 | 2/1985 | Lee et al. | 346/140 |
| 5,847,724 | 12/1998 | Mantell | 347/15 |

*Primary Examiner*—Arthur T. Grimley
*Assistant Examiner*—Hoang Ngo

[57] ABSTRACT

A printing technique is disclosed which takes into account the actual ink drop volumes of the print cartridges used in an inkjet printer. In one embodiment, each of the print cartridges is tested by the manufacturer, and its actual ink drop volume is determined. This actual ink drop volume, or the variance from the nominal ink drop volume, is encoded on the print cartridge itself using any number of techniques. The host computer, which converts RGB tone values to CMYK ink tone values to be printed, reads the information regarding the ink drop volume and adjusts the CMYK tone values as necessary to compensate for the variance in the ink drop volumes. Accordingly, the printer and host computer will adjust the number of CMYK ink drops printed for a particular pixel position on the medium based upon the actual ink drop volumes for the color print cartridges used in the printer.

23 Claims, 10 Drawing Sheets

INK DROP VOLUME VARIANCE COMPENSATION FOR INKJET PRINTING

CROSS-REFERENCE TO RELATED APPLICATIONS

This application incorporates by reference the following patents and applications assigned to the present assignee: U.S. Pat. No. 5,638,101, entitled High Density Nozzle Array for Inkjet Printhead, by Brian Keefe, et al.; U.S. patent application Ser. No. 5,971,529, filed Oct. 30, 1997, HP Docket No. 10971514-1, entitled Table Based Fast Error Diffusion Halftoning Technique, by Kevin Hudson et al.; U.S. patent application Ser. No. 08/708,143, filed Aug. 30, 1996, HP Docket No. 10960238-1, entitled Automatic Ink Interconnect Between Print Cartridge and Carrier, by Norman Pawlowski, Jr. et al.; and U.S. Pat. No. 5,408,746, entitled Datum Formation for Improved Alignment of Multiple Nozzle Members in a Printer, by Jeffrey Thoman et al.

FIELD OF THE INVENTION

This invention relates to inkjet printing and, in particular, to a technique for achieving accurate color printing despite variances in ink drop volume by the inkjet printheads.

BACKGROUND

High quality color inkjet printers, typically using cyan, magenta, yellow, and black inks (CMYK inks), strive to reproduce as best as possible the red, green, blue (RGB) image generated by a computer and displayed on a color monitor. Hence, the computer signals corresponding to the RGB tone values are converted to signals for ejecting cyan, yellow, magenta, and black ink droplets by the inkjet printer to reproduce the RGB image on the color monitor.

Techniques already exist for conversion of the RGB signals into corresponding CMYK signals for printing by the inkjet printer; however, these conversion techniques assume a nominal ink drop volume per nozzle by each of the print cartridges used in the inkjet printer. One particular print cartridge ejects an ink drop having a nominal volume of 8 picoliters from a nozzle when an energization signal is applied to an ink ejection element associated with the nozzle. Further detail regarding the operation of an inkjet printer may be found in U.S. Pat. No. 5,638,101 by Brian Keefe et al., entitled High Density Nozzle Array For Inkjet Printhead, incorporated herein by reference.

Due to fabrication variances, the ink drop volume for a print cartridge may differ by as much as 30% from the nominal value. This causes the calculated CMYK tone values to not accurately be represented by the final printed image on the medium. A lower ink drop volume for a cyan print cartridge, for example, causes a lighter cyan tone to be printed, and a higher ink drop volume causes a darker cyan tone to be printed. This problem is exacerbated when one color print cartridge in the printer (e.g., magenta) has a positive ink drop volume variance from nominal, while another print cartridge (e.g., yellow) has a negative ink drop volume variance. This not only distorts the brightness of the printed image but distorts the color (hue) printed as well.

Accordingly, what is needed is a technique for accurately reproducing color images using an inkjet printer which is independent of the ink drop volume variances of the color print cartridges used in the printer.

SUMMARY

A printing technique is disclosed which takes into account the actual ink drop volumes of the print cartridges used in an inkjet printer. In one embodiment, each of the print cartridges is tested by the manufacturer, and its actual ink drop volume is determined. This actual ink drop volume is encoded on the print cartridge itself using any number of techniques. In one embodiment, a silicon chip is provided on the print cartridge which identifies the actual ink drop volume along with other information unrelated to this invention. In another embodiment, a computer readable medium, such as a diskette, is provided along with the print cartridges which is then programmed into a computer controlling the printer. This printer driver program contains the ink drop volume for the actual print cartridges used in the printer.

The host computer, which converts the RGB tone values to the CMYK ink tone values to be printed, reads the information regarding the ink drop volumes and adjusts the CMYK tone values as necessary to compensate for the variance in the ink drop volumes. These modified CMYK tone values are then appropriately processed using any of a variety of halftoning techniques.

Either the printer or the computer then identifies the number of ink drops to be ejected for each of the CMYK print cartridges for each pixel position. In another embodiment, the above process is performed using a printer incorporating a tricolor print cartridge.

Accordingly, the printer and host computer will adjust the number of CMYK ink drops printed for a particular pixel position on the medium based upon the actual ink drop volumes for the color print cartridges used in the printer.

DETAILED DESCRIPTION OF THE EMBODIMENTS

Figure 1:
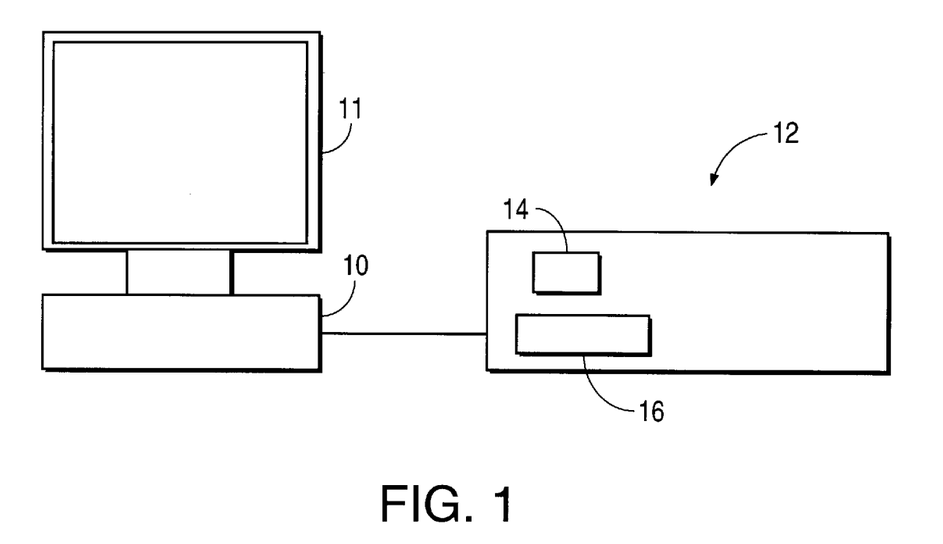
FIG. 1 illustrates a conventional computer, with monitor, connected to a printer, where the computer and printer are configured to carry out the present invention.

FIG. 1 is a diagram of a printing system which includes a host computer 10, a monitor 11 (e.g., a CRT), and an inkjet printer 12. Printer 12 includes color print cartridges 14 which scan across a medium and eject droplets of color ink as described below. Instead of multiple print cartridges, a single print cartridge which contains three different colors of ink and three printheads, one for each color, may be used.

Printer 12 includes a printer controller 16 which receives coded signals from computer 10 and provides firing signals to the print cartridges 14 to print color dots. The print cartridges may print at 300 dots-per-inch (DPI), 600 DPI, or any other resolution. If multiple drops of the same color ink are to be deposited over the same pixel position to print a multi-drop ink spot on the medium, the carriage containing print cartridges 14 may make multiple scans across the medium to print such overlapping dots. Additional detail regarding one specific type of printer is provided later with respect to FIG. 8.

The techniques described herein for converting an RGB image generated by computer 10 to ink droplets ejected from print cartridges 14 may be implemented using a combination of hardware and software, where portions of the hardware/software are located in computer 10 and other portions located in printer 12. The location of the hardware/software for carrying out this method is a matter of design choice.

Figure 2:
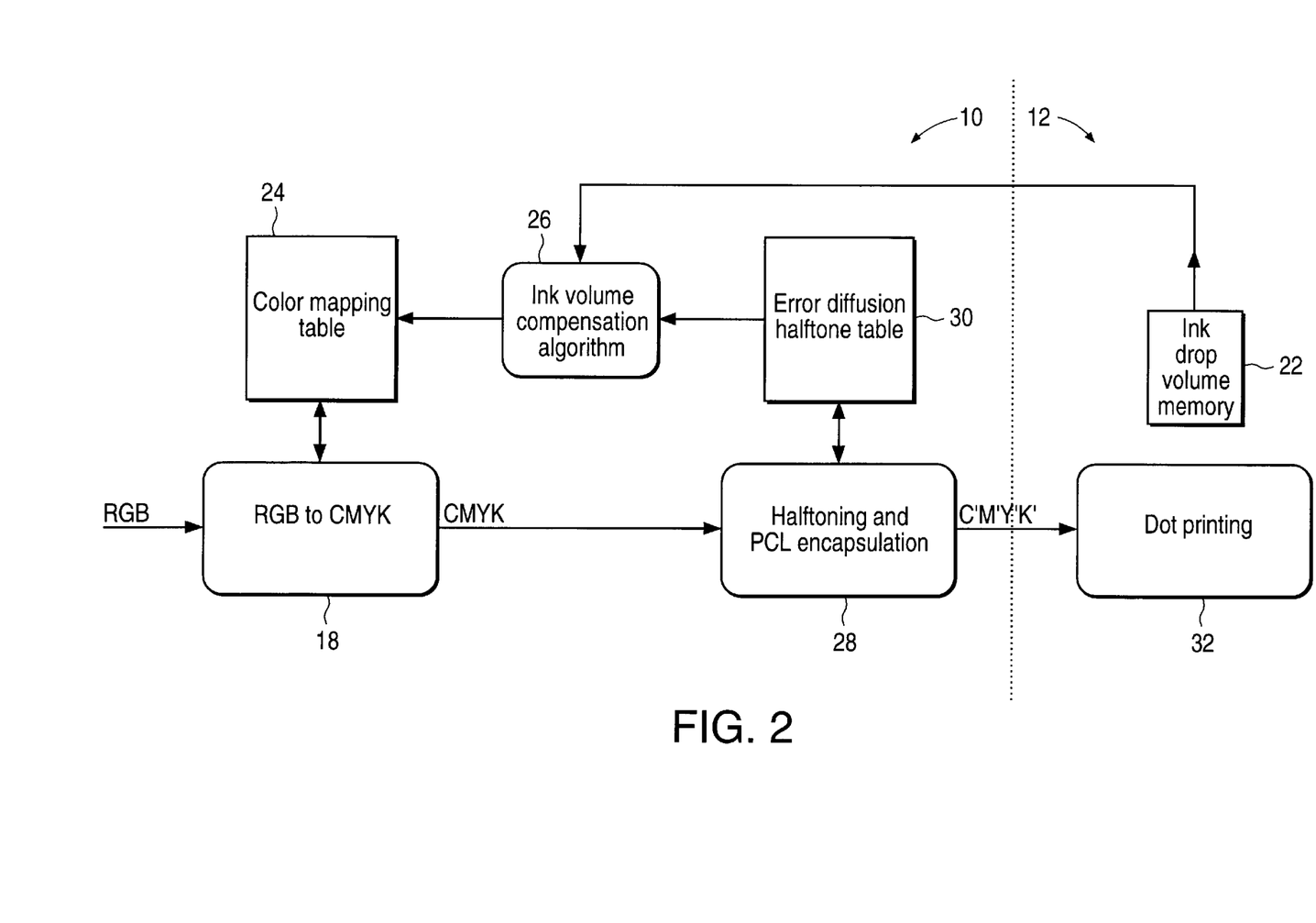
FIG. 2 illustrates the basic functional units of a computer and printer incorporating one embodiment of the present invention.

FIG. 2 illustrates the basic functional units in computer 10 and printer 12 used for carrying out one embodiment of the invention. One skilled in the art will understand how to implement such functional units after reading this disclosure.

Figure 3:
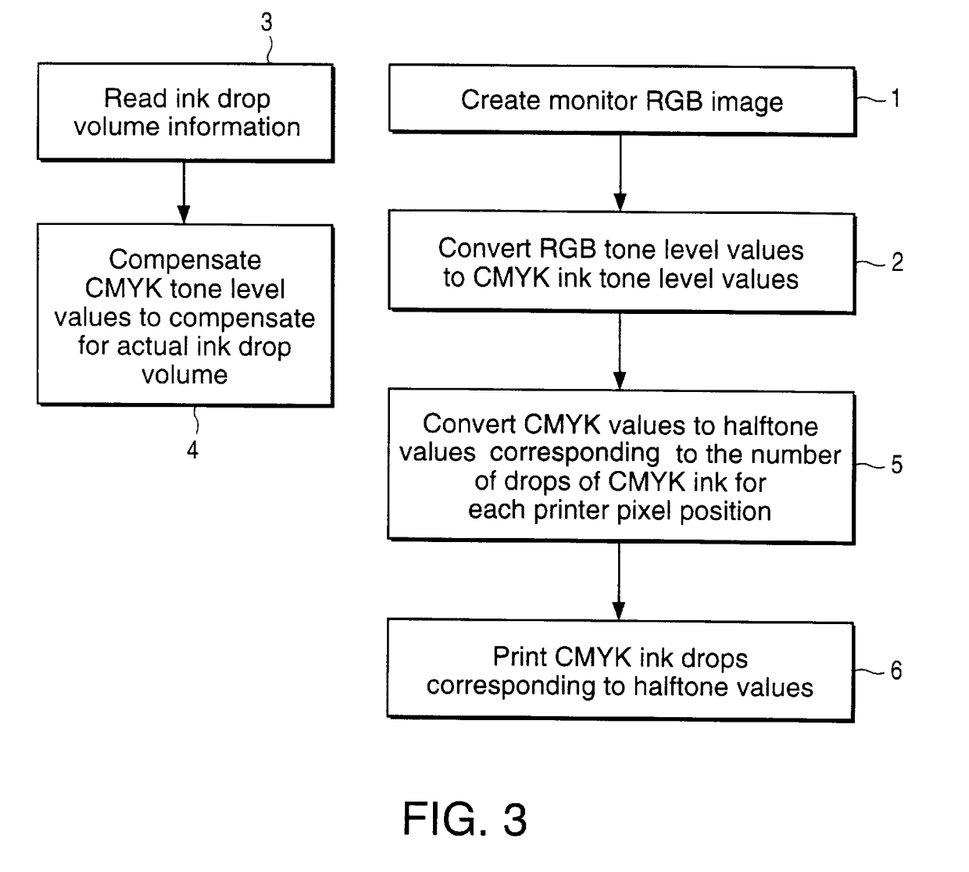
FIG. 3 is a flowchart illustrating the basic steps in one embodiment of the invention.

FIG. 3 is a flowchart illustrating the basic steps carried out by the functional units of FIG. 2.

In step 1 (FIG. 3), computer 10 generates an RGB image on monitor 11 using conventional techniques. The RGB signals are generally 8 bits wide for each of the red, green, and blue color components, for a total of 24 bits per pixel.

In step 2, these RGB signals are then applied to an RGB-to-CMYK converter 18, which converts the red, green, and blue tone values to cyan, magenta, yellow, and black tone values. Converter 18 may be implemented in hardware or software.

As previously mentioned, manufacturing variances cause the ink drop volumes for different print cartridges to differ, typically from lot to lot. If the CMYK tone values output from converter 18 were not compensated for these variances in ink drop volumes, the brightness levels and hues in the printed image would differ from those intended. The present invention compensates for these ink drop volume variances by reading information stored in a memory, either on the print cartridge 14, in printer 12, or in computer 10, which conveys the actual ink drop volume for each of the print cartridges 14 installed in printer 12.

In one embodiment, each fabricated print cartridge is tested on the manufacturing line to measure its ink drop volume output for a single pulse applied to an ink ejection element in the print cartridge printhead. In another embodiment, the print cartridges in a lot are sampled to determine the ink drop volume for all print cartridges in the lot, since ink drop volume variances tend to vary from lot to lot. The actual ink drop volume (or, alternatively, its variance from a nominal ink drop volume) is then stored in a memory associated with the applicable print cartridge.

Figure 9:
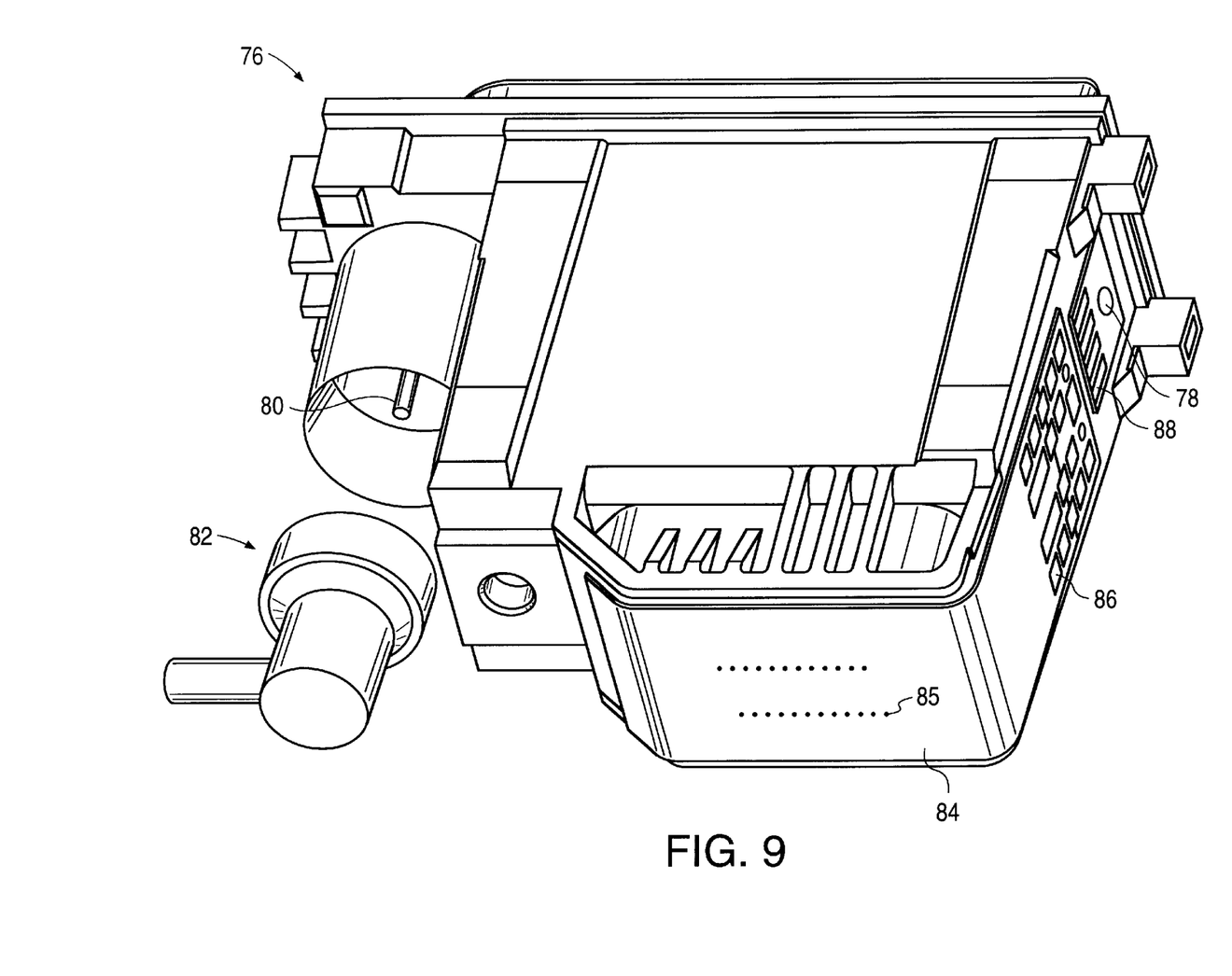
FIG. 9 is a perspective view of a print cartridge for use in the printer of FIG. 8 which incorporates a means for recording the actual ink drop volume for that particular print cartridge.

In one embodiment, this ink drop volume is stored on a semiconductor chip secured to the print cartridge itself, to be described in more detail with respect to FIG. 9. Terminals of the memory chip are electrically contacted by electrodes in the scanning carriage, and computer 10 addresses these terminals to identify the measured ink drop volumes for each of the print cartridges 14. This step is identified as step 3 in FIG. 3. The step of reading the ink drop volume information for each of the print cartridges need only occur once when the system is turned on.

The memory for storing the ink drop volume for a particular print cartridge is shown in FIG. 2 as memory 22.

In an alternate embodiment, the measured ink drop volume for each of the print cartridges is stored on a computer readable medium, such as a microdiskette, and the microdiskette is used to program computer 10 with the ink drop volume information along with any other printer driver information typically programmed into computer 10 for a particular printer 12.

A color mapping table 24, which may be implemented in either hardware or software, receives RGB tone values in conjunction with halftoning errors as an index for addressing corresponding CMYK values. Since the RGB pixel information generated by the computer 10 is usually at a resolution different from the printer resolution, the RGB tone values are converted into CMYK values at the resolution of the inkjet printer 12. For example, a single RGB tone value for a pixel displayed by monitor 11 at a resolution of 75 dots per inch will be represented by multiple CMYK pixels for a printer which prints at a resolution of 300 dots per inch or greater. The data stored in the color mapping table 24 may take into account color correction due to the particular CMYK inks used and the inherent limitations of printing colors with ink, in addition to the ink drop volume compensation provided by the present invention. For example, some RGB colors on a monitor cannot be printed, so these RGB colors must be mapped to the closest color that can be printed. Such resolution conversion and color correction to best match the monitor color to a printed color (using a nominal ink drop volume) are known in the art.

The ink volume compensation algorithm 26 modifies the original CMYK tone values from table 24 to compensate for ink drop volume variances of the C, M, Y, or K print cartridges when the actual drop volume differs from the nominal ink drop volume. This compensation step is shown in step 4. Step 4 may be conducted when the system is first turned on to modify all the CMYK entries in table 24. Details of this compensation and conversion process are further provided with respect to FIG. 4.

In another embodiment, the tone values in table 24 are compensated for the actual ink drop volume and stored on a microdiskette as a printer driver program. The microdiskette is then provided along with the print cartridges to the consumer for programming computer 10.

Referring back to FIG. 3, the CMYK tone values output from converter 18 are applied to a halftoning unit 28 which also translates the printing signals into printer control language (PCL) to provide an economical and efficient way for application programs to control the range of printer features across a number of printing devices. PCL printer language was developed by Hewlett-Packard and is described in the manual "PCL 5 Printer Language Technical Reference Manual," 1992, available from Hewlett-Packard Company and incorporated herein by reference. The PCL conversion process is performed by software. The specific halftoning and PCL encapsulation methods used are beyond the scope of this disclosure; however, additional detail regarding the halftoning and error diffusion techniques used in one embodiment of the invention will be described later with respect to FIGS. 6 and 7.

Halftoning is needed to effectively print thousands of colors and intensities using only a few droplets of C, M, Y, and K inks per pixel. For example, a typical computer generates 256 levels of intensity for each of the additive primary colors red, green, and blue, which can be combined to produce millions of colors and also black. Color inkjet printers provided with three colors of ink and black cannot print pixel colors having 256 levels of intensity and must use halftoning so that the overall color tone in an area on the medium closely matches that of the original image for that area. Halftoning methods are described in the book Digital Halftoning, by Robert Ulichney, the MIT press, 1987, incorporated herein by reference.

One major approach to halftoning is error diffusion. The decision about whether or not to print a dot of a particular color (or how many overlapping dots of a color to print) is based not only on the "ideal" intensity (i.e., one of 256 possible intensities for a color) for that pixel, but on what has happened before for previously processed pixels. Hence, errors will be generated for each dot printed signifying the error between the printed tone level and the ideal tone level. This error will be diffused to nearby pixels, and an attempt will be made to minimize the error. When the printed image is viewed from a distance, the individual dots will not be perceptible, and the color tones from the individual dots will effectively blend to reproduce the image on the computer monitor.

Figure 6:
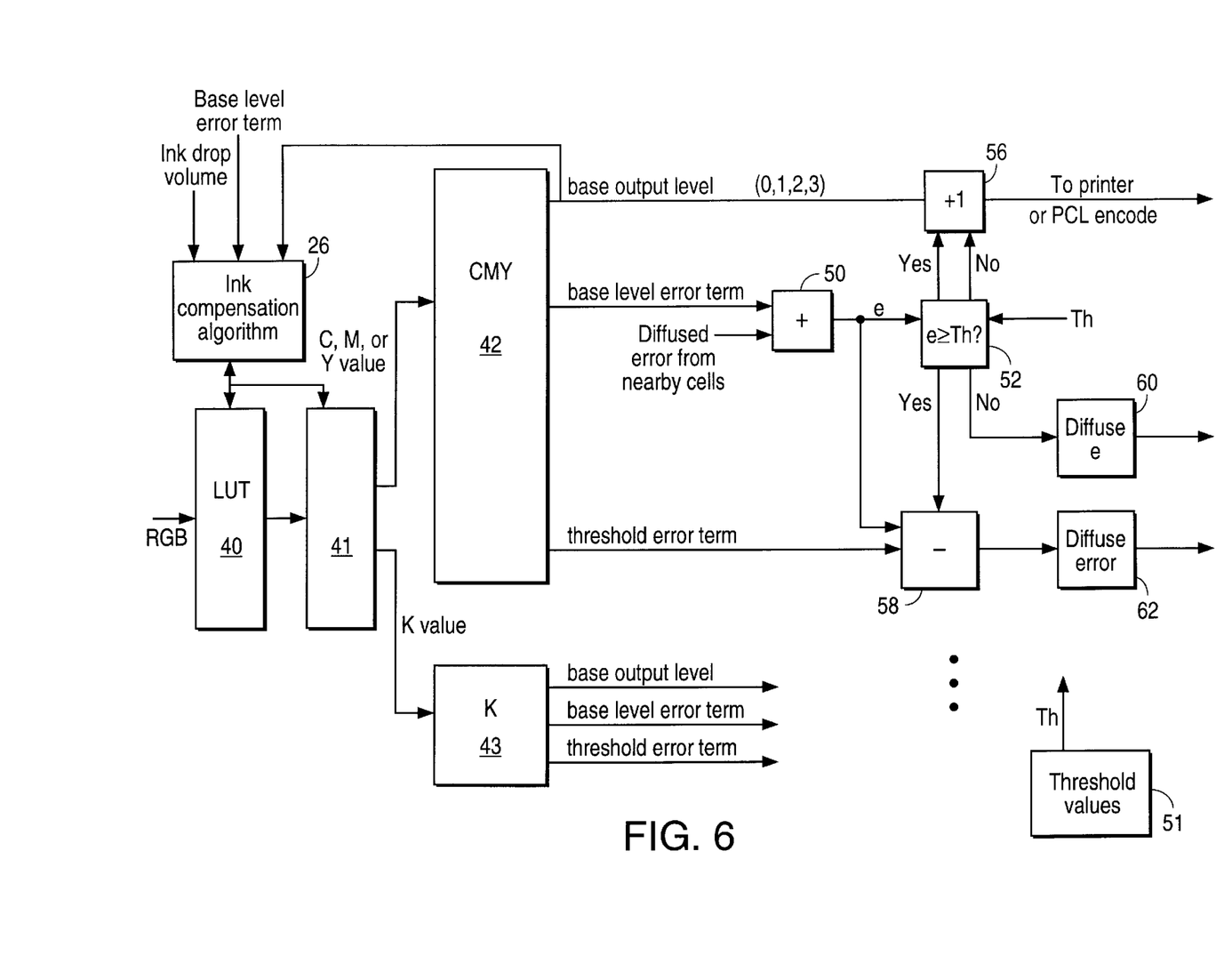
FIG. 6 illustrates one embodiment of a halftoning circuit for converting RGB values into signals corresponding to the number of ink drops of each primary color for each pixel position.

The halftoning unit 28 accesses an error diffusion halftone table 30, to be described in detail with respect to FIG. 6, which identifies a tone output level and the resulting error between the output tone level and the input tone level from converter 18 for a particular pixel position. The error is diffused to nearby pixels by halftoning unit 28 and is later used to select a compensated CMYK color tone level.

When compensating the CMYK entries in the color mapping table 24, the ink volume compensation algorithm 26 receives an error term from the error diffusion halftone table 30 along with the ink drop volume information from memory 22 in order to compensate the CMYK tone level values in table 24 for the actual ink drop volume along with the error. After the algorithm 26 has modified the CMYK entries in table 24, the output of converter 18 will be the compensated CMYK entries indexed by the incoming RGB tone values.

The halftoning unit 28 will generate base output levels (e.g., 1,2,3, or 4) for each of the C, M, Y, and K inks, corresponding to the number of ink drops for each ink color to be deposited for a particular pixel position (step 5 of FIG. 3). An additional conversion may be made by computer 10 or printer 12 to convert these base output levels to the actual number of ink drops to be deposited. In one embodiment, a base output level of 0 corresponds to 0 ink drops; a base output level of 1 corresponds to 1 ink drop; a base output level of 2 corresponds to 3 ink drops; and a base output level of 3 corresponds to 8 ink drops being deposited on the medium.

In response to these signals, the printer 12 then generates energization signals for application to the terminals of each print cartridge to energize the various ink ejection elements in the printhead for ejecting droplets of ink, each having the ink drop volume identified by the ink drop volume memory 22. The conversion of the signals transmitted by the computer 10 to printer 12 into such energization signals and the printing of dots themselves is identified as dot printing 32 in FIG. 2 and shown in step 6.

The general functions performed by the halftoning and PCL encapsulation circuit 28, error diffusion halftone table 30, and dot printing 32 may be carried out by conventional techniques, and these techniques need not be described in detail for one of ordinary skill in the art to implement the invention.

Ink Volume Compensation Routine

Figure 4:
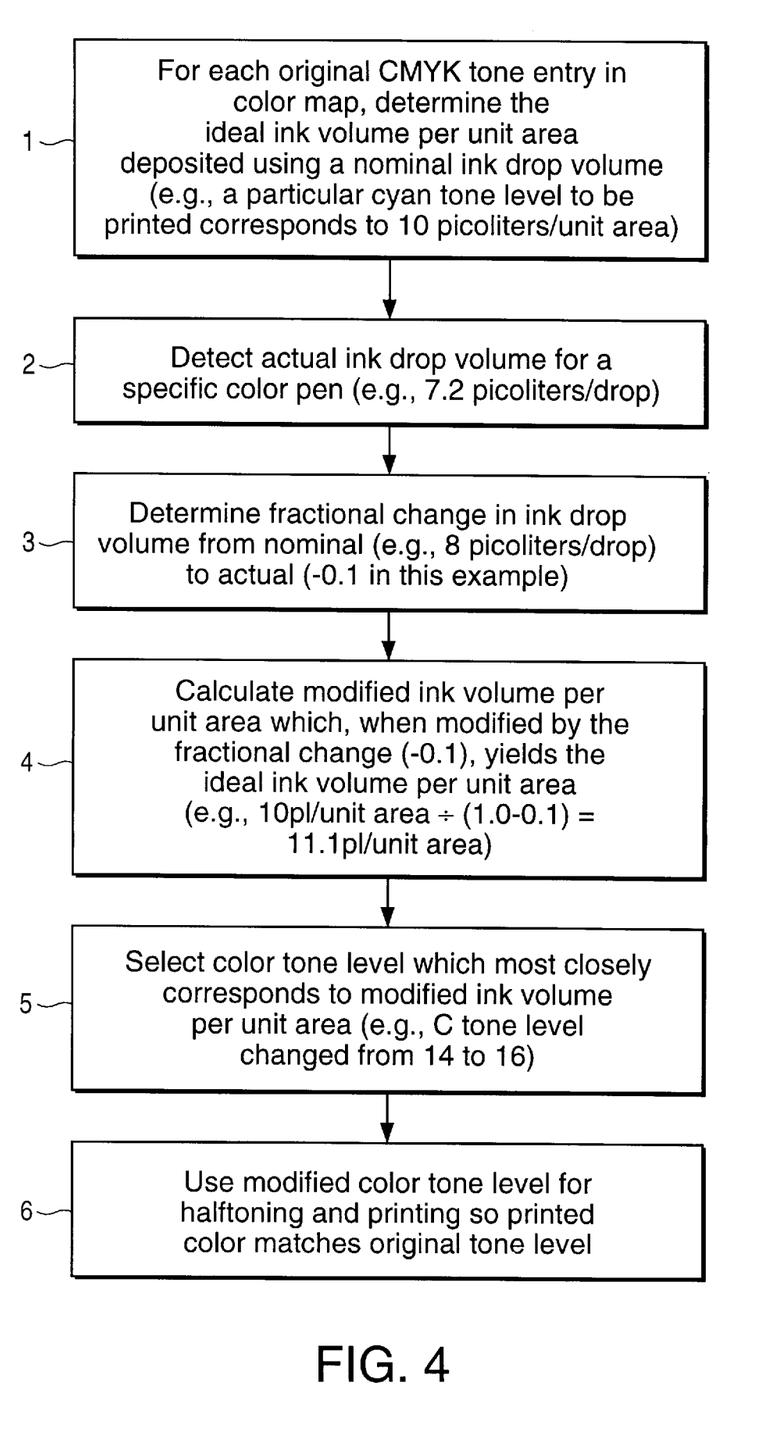
FIG. 4 is a flowchart showing in greater detail the steps for converting CMYK tone level values into modified CMYK tone level values based on the actual ink drop volume of each of the print cartridges used in an inkjet printer.

FIG. 4 is a flowchart identifying the basic steps performed by the ink volume compensation algorithm 26 of FIG. 2 in combination with the color mapping table 24 and the RGB-to-CMYK converter 18.

Although in the preferred embodiment the ink volume compensation algorithm 26 takes into account an error term, the error term will be ignored for simplicity in this example and will be discussed in further detail in FIGS. 5–7. The below-described process may take place when the system is first turned on.

In step 1 of FIG. 4, for each CMYK tone value stored in the color mapping table 24, the ideal ink volume per unit area (i.e., per pixel) for that CMYK tone entry is calculated using a nominal ink drop volume. Such an ideal ink volume per unit area is based on the number of drops of ink for the C, M, Y, or K tone entry, plus any fractional drops of ink, using a nominal ink drop volume. In the example of step 1 given in FIG. 4, a particular cyan tone level in table 24, prior to compensation, corresponds to an ideal ink volume per unit area of 10 picoliters per unit area.

In step 2, the actual ink drop volume for a specific color pen in printer 12 is detected. In one embodiment, this actual ink drop volume is stored in a memory chip on the pen itself. This actual ink drop volume may be either the ink drop volume itself or a fractional variation of the actual ink drop volume from the nominal ink drop volume or in any other form. It will be assumed for the example of FIG. 4 that the actual ink drop volume for the cyan pen used in the printer is 7.2 picoliters per drop.

In step 3, the fractional change in ink drop volume from the nominal (assume 8 picoliters per drop nominal) is calculated. In the example of FIG. 4, since the actual ink drop volume is less than the nominal ink drop volume by 1/10th of the nominal ink drop volume, the fractional change is −0.1.

In step 4, the modified or compensated ink volume per unit area is calculated, where this modified ink volume is that ink volume which, when modified by the fractional change, yields the ideal ink volume per unit area. In other words, this modified ink volume per unit area, when reduced by the fractional change, will equal the ideal ink volume per unit area. In the particular example of FIG. 4, this modified or compensated ink volume per unit area is 11.1 picoliters per unit area.

Hence, the color tone level in the color mapping table 24 which corresponds to this modified ink volume per unit area will result in the originally desired tone level when printed by the cyan print cartridge having the reduced ink drop volume.

In step 5, the color tone level from the color mapping table 24 which most closely corresponds to the modified ink volume per unit area is selected. This matching color tone level may then replace the original color tone level in table 24, or a separate table with compensated values may be created. The compensated table may be created in computer 10 or may be created external to computer 10 and later programmed into computer 10.

In step 6, the selected tone value is then transferred from converter 18 to the halftoning and PCL encapsulation unit 28 for halftoning and further processing. The output of the halftoning and PCL encapsulation unit 28 will be a PCL-encoded signal containing information identifying the number of drops from the cyan print cartridge to be deposited at a pixel position on a medium.

Figure 5:
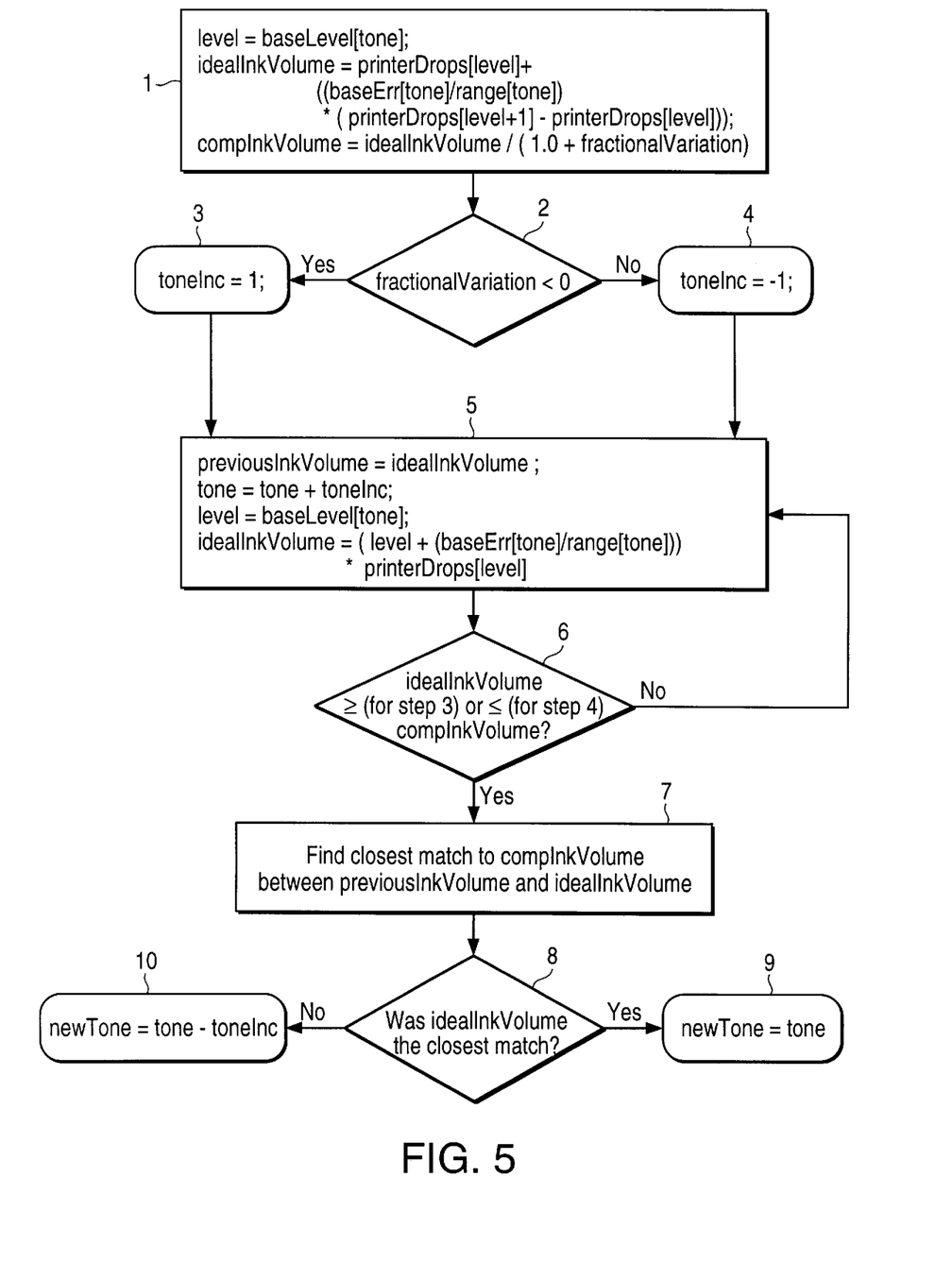
FIG. 5 is a flowchart, using mathematical terminology depicting an actual software program, showing steps for converting a CMYK tone level value to a modified CMYK tone level value based on the actual ink drop volume of a print cartridge used in the ink jet printer.

FIG. 5 identifies steps, using mathematical terms, which may be used in a software program to carry out the calculations for the ideal ink volume and the compensated ink volume, and to carry out a reiterative process for incrementing or decrementing the initial tone value until the tone value results in an ink volume which best matches the compensated ink volume. The color entry in the color mapping table 24 that best matches the compensated ink volume is then used for printing instead of the original color entry.

Description of Halftoning and Error Diffusion Circuit

The process of FIG. 5 may be performed by the halftoning circuit of FIG. 6. FIG. 6 can be implemented using any combination of hardware and software. To fully understand the flowchart of FIG. 5, the halftoning and error diffusion circuitry of the preferred embodiment shown in FIGS. 6 and 7 should first be explained.

Figure 7:
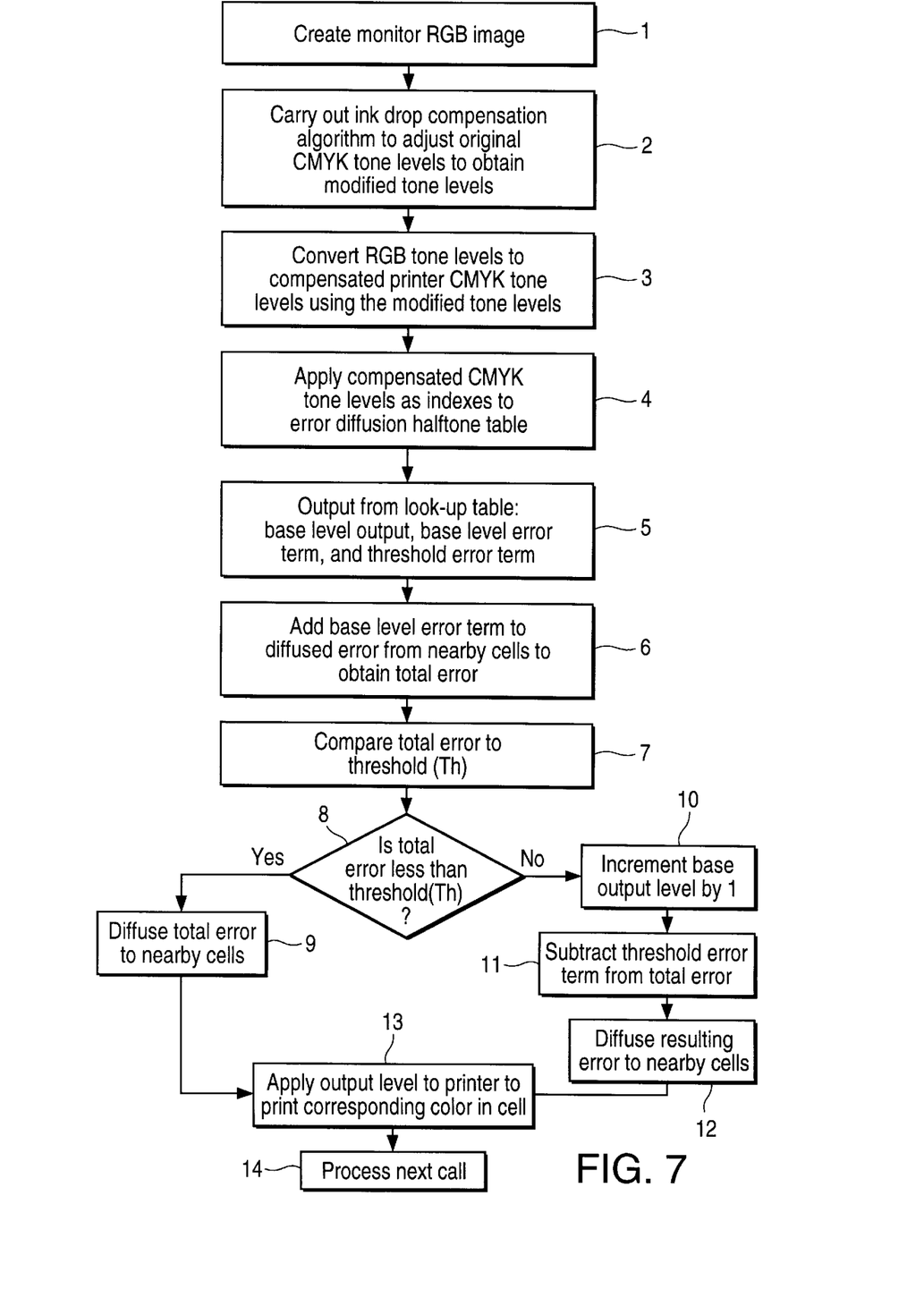
FIG. 7 is a flowchart illustrating the operation of the structure of FIG. 6 for halftoning.

FIG. 7 is a flowchart illustrating the general method carried out by the halftoning circuit of FIG. 6, which is only one of many ways to perform halftoning. It is assumed in the flowchart of FIG. 7 that the image to be printed by the printer is first generated in a computer; however, the original image may be generated by any other means.

In step 1 of FIG. 7, a color image is generated by a computer 10 (FIG. 1) and displayed on a monitor 11 using conventional means. A 24-bit RGB color image is held in the memory of computer 10 so that it can be displayed on monitor 11.

In step 2 of FIG. 7, to be described in detail with respect to FIG. 5, the ink drop volume compensation algorithm 26 is carried out using the ideal ink volume, compensated ink volume, base level output from table 42 in FIG. 6, and base level error term from table 42 in FIG. 6 to adjust the C, M, Y, or K tone levels in table 40 in FIG. 6 to compensate for variances in the C, M, Y, or K print cartridge ink drop volume. In the preferred embodiment, this is a reiterative process.

In step 3 of FIG. 7, the RGB values are converted to the compensated CMYK values at the resolution of the printer 12. In one embodiment, a combination of a look-up table 40 (FIG. 6) and a software interpolation routine 41 is used to perform the color conversion. Look-up table 40 is similar to table 24 in FIG. 2. The most significant 4 bits of each of the RGB colors is applied as an index to the look-up table 40. The remainder of the bits are used to interpolate the output of the look-up table 40 to obtain the closest color in CMYK ink space. The result of the interpolation is a 32-bit CMYK color code for each pixel at the resolution of the printer. In another embodiment, the interpolation routine 41 is deleted and one or more look-up tables are used to convert the RGB values into CMYK values.

The look-up table 40 may be implemented in software or hardware.

In step 4 of FIG. 7, and as shown in FIG. 6, the compensated C, M, and Y tone values are applied to look-up table 42, and the compensated K tone value is applied to look-up table 43. In the embodiment of FIG. 6, the C, M, and Y values are each applied to the look-up table 42 at separate times. The subsequent logic performed on the output of the look-up table 42 knows which of the C, M, or Y colors is being processed.

Look-up tables 42 and 43 are encompassed in the error diffusion halftone table 30 in FIG. 2.

In an alternate embodiment, the CMYK values are applied to the same look-up table or each color applied to a different look-up table.

Since the logic functions applied to the output of each of the look-up tables 42 and 43 are identical, only the logic functions performed on the output of look-up table 42 will be described in detail.

The look-up tables 42 and 43 are programmed to output three 8-bit values upon being indexed with an 8-bit tone value. For convenience, each addressable word contains four bytes, where one of the bytes is not currently used but may be used for a future implementation. The three output bytes convey: base output level, base level error term, and threshold error term (step 4). The base output levels in this particular embodiment are 0, 1, 2, or 3. These levels are related to the intensity level of that particular ink color. The 0, 1, 2, or 3 value identifies the number of drops of that color ink to be deposited on the medium by the printer in a particular pixel position or cell. These four levels may correspond to 0, 1, 2, or 3 ink drops, or 0, 1, 3, or 8 ink drops, or any other correlation between the level and the number of ink drops. Overlapping ink drops on a medium may be achieved by using multiple scans of the printhead across the medium while the medium is held stationary by the printer.

As will be described in greater detail later, the particular embodiment described includes logic for incrementing the base level output by one when the accumulated error for that cell exceeds a certain threshold. This can result in a negative error, due to the increased darkness for that cell. In other cases, a positive error is generated for that cell. If the base output level is incremented, the threshold error term is used. In alternative embodiments, there is no means for incrementing the output level, and the error will always be positive. Thus, in these alternative embodiments, there is no threshold error term generated.

In step 6 of FIG. 7, the base level error term is summed (by summer 50) with the diffused error from nearby cells generated in previous operations. The diffused errors may be stored in an image map memory and addressed at the appropriate time by an ASIC or other processor to apply the appropriate diffused error to the summer 50.

The output of summer 50 is the total error for that cell, given the base output level.

External to look-up tables 42 and 43 may be a separate look-up table 51 or an algorithm for generating a threshold (Th) for that particular cell. This threshold may be obtained from a list of thresholds, for example, between 5 and 69, with randomly listed thresholds being sequentially addressed and applied to a cell. A threshold may also be a fixed threshold for a plurality of cells; however, it is known that varying the thresholds reduces the likelihood of visual artifacts in a printed image.

In step 7, this threshold (Th) is applied to one input of a comparator 52, where the other input is the total error for the cell. If a total error is less than the threshold (step 8), the base output level is not incremented, and the total error for the cell is diffused to neighboring cells (step 9).

In one embodiment, half of this total error is diffused to the cell immediately to the right of the current cell being processed (i.e., the next cell to be processed), and half of the total error is diffused to the cell immediately below the cell being processed. Other error diffusion techniques may also be used, such as four-term error diffusion, where one fourth of the total error is applied to four neighboring cells. These cells may be the cell immediately to the right of the current cell and the three adjacent cells below the cell being processed. In one embodiment, cells are processed from left to right and from row to row. In other embodiments, the cells are processed in a serpentine fashion.

If comparator 52 determines that the total error is equal to or greater than the threshold (Th), then the output level is to be incremented by one (step 10). This is illustrated in FIG. 6 by issuing a signal to incrementor 56 to increment the base output level.

Incrementing the base output level by one causes the printed color spot to be darker for that particular color. In step 11, a subtractor 58 subtracts the threshold error term output by look-up table 42 from the total error for the cell and outputs the resulting error value. The resulting error output from subtractor 58 may be positive or negative. The resulting error output from subtractor 58 is then diffused (step 12) to neighboring pixels as previously described.

The error diffusion shown by blocks 60 and 62 may be performed by an ASIC in conjunction with a memory or by the computer itself.

The resulting base output level is then PCL encoded and sent to the printer (step 13) for printing the appropriate number of dots for that particular color, and the next cell is processed (step 14).

The identical logical functions are performed for the magenta and yellow components. If the black ink has the same ink drop volume and resolution as the C, M, and Y inks, the black ink look-up table 43 in FIG. 6 may be deleted, and look-up table 42 may be used for the black ink.

Appendix 1 shows values for a particular look-up table indexed by one of 256 tone levels.

Further detail of a halftoning and error diffusion circuit is found in U.S. Pat. No. 5,971,529, HP Docket No. 10971514-1, entitled Table Based Fast Error Diffusion Halftoning Technique, by Kevin Hudson et al; incorporated herein by reference.

Detailed Description of Software Routine for Ink Volume Compensation Algorithm

The flowchart of FIG. 5 shows in detail the compensation routine of step 2 in FIG. 7.

In step 1 of FIG. 5, for a color entry in table 24 of FIG. 2 or table 40 of FIG. 6, the base output level and base level error term from look-up table 42 in FIG. 6 are applied to the ink compensation algorithm 26. The ideal ink volume per unit area is then calculated. The ideal ink volume is based on the number of ink drops corresponding to the base output level plus any fraction of the number of ink drops for the next base output level. This fraction is the ratio of the base error term and the range of tones between the base output level and the next output level, multiplied by the difference in ink drops between the base output level and the next base output level. The ideal ink volume is that ink volume which must be deposited, given a nominal ink drop volume for a particular print cartridge containing the ink of interest, to achieve the C,M,Y, or K tone corresponding to an input RGB tone.

Also in step 1 of FIG. 5, the compensated ink volume for the color tone entry is calculated based upon the ideal ink volume and the fractional variation between the actual ink drop volume and the nominal ink drop volume.

If the actual ink drop volume is less than the nominal ink drop volume (step 2), then the fractional variation will be negative, requiring a compensated CMYK color tone to be darker than (or greater than) the original color tone matching the RGB value applied to look-up table 40 in FIG. 6. The reverse holds true if the fractional variation is positive. This is indicated by steps 3 and 4, respectively, in FIG. 5 which provide an incrementing or decrementing tone value (+1 or −1) for use in the reiterative process described below.

In step 5 of FIG. 5, the initial tone value is incremented by one or decremented by one, as determined by steps 3 or 4, for each step of the reiterative process, and the base output level and base level error term for this incremented or decremented tone value is determined from table 42 in FIG. 6. At each reiterative step, the ideal ink volume is calculated based on the incremented or decremented tone level.

In step 6, this new ideal ink volume is then compared to the compensated ink volume calculated in step 1. If the ideal ink volume, for calculations which incremented the tone level, is greater than or equal to the compensated ink volume, or, for calculations which decremented the tone level, is less than or equal to the compensated ink volume, the process moves to step 7; otherwise, the process goes back to step 5 to increment or decrement the tone level.

In step 7, it is determined whether the previous ink volume calculated in step 5 or the current ideal ink volume (from the last iteration) is the closest match to the compensated ink volume.

In step 8, if the ideal ink volume is the closest match, meaning the last iteration is to be used, then the new tone level (step 9) for replacing the original color tone entry is that tone level generated in the last iteration in step 5. If the previous ink volume is the closest match, then the process goes to step 10, which indicates that the new tone level for replacing the original color tone entry is the previous tone generated in step 5.

The process is repeated for each of the color entries in table 24 in FIG. 2 or for each of the colors that may be selected in table 40 and interpolation routine 41 in FIG. 6.

Description of Color Printer and Print Cartridge

Figure 8:
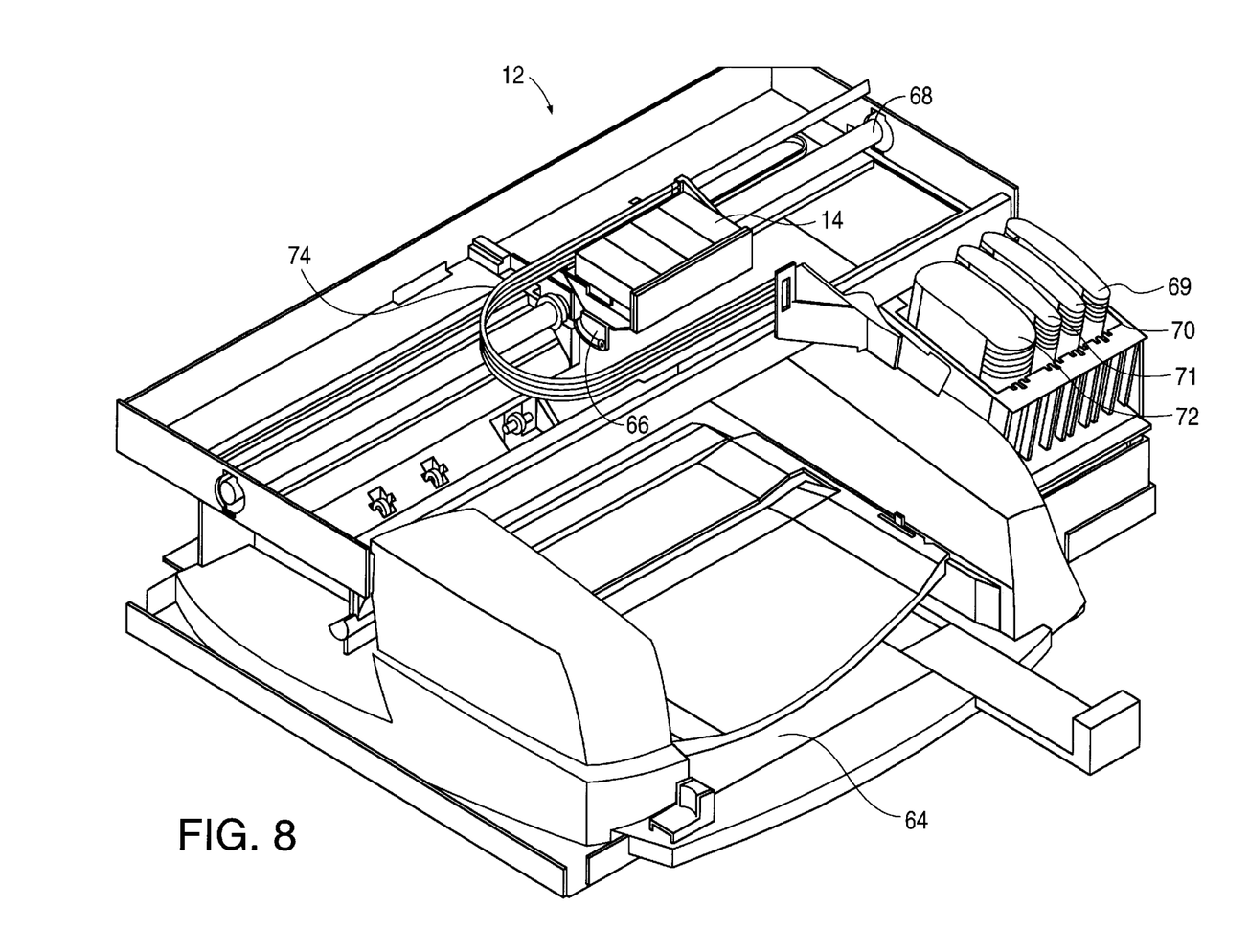
FIG. 8 is a perspective view of an inkjet printer which incorporates the present invention.

FIG. 8 illustrates one type of color inkjet printer 12 which includes processing circuitry for performing all or part of the error diffusion technique described herein. The color inkjet printer includes a paper tray 64 for holding virgin paper, an output tray for receiving the printed pages, color ink print cartridges 14, and a scanning carriage 66 for sliding along a slide bar 68 while dots are being printed on the paper. In one embodiment, the color print cartridges 14 including cyan (C), magenta (M), yellow (Y), and black (K) ink print cartridges. Other combinations of ink, such as CMY, may also be used. Further, a separate print cartridge need not be provided for each color ink; a single replaceable print cartridge may print two or more colors of ink with an associated array of ink ejection nozzles for each color. In FIG. 8, the ink supply 69–72 for each of the scanning printheads is stationary and connected to an associated printhead by a tube 74. Inkjet print cartridges in inkjet printers are well known to those of ordinary skill in the art. U.S. Pat. No. 5,638,101, entitled High Density Nozzle Array for Inkjet Printhead, to Brian J. Keefe et al., describes the structure of a suitable inkjet print cartridge. This patent is assigned to the present assignee and incorporated herein by reference.

FIG. 9 is perspective view of one type of print cartridge 76 which incorporates a memory chip 78 identifying the actual ink drop volume for cartridge 76. Print cartridge 76 has a hollow needle 80 which is inserted into a rubber septum in a scanning carriage for receiving ink from a stationary ink supply. The ink connector 82 on the carriage is also shown in FIG. 9.

A flexible tape 84 (a TAB circuit) contains conductive traces and nozzles 85 and forms part of the printhead assembly. Contact pads 86 for connection to electrodes on the carriage are also shown. One such carriage is disclosed in U.S. Pat. No. 5,408,746, entitled Datum Formation for Improved Alignment of Multiple Nozzle Members in the Printer, by Jeffrey Thoman et al., incorporated herein by reference.

The memory chip 78 is mounted on a plate having terminals 88 connected to pads on the chip 78. These terminals 88 contact electrodes on the carriage so the printer can read the ink drop volume information. Instead of chip 78, any other coding technique may be used to convey the ink drop information. Such ways may include a coded conductive pattern on print cartridge 76 or a coded interconnection of contact pads 86, or even coded tabs or other physical means for being detected by the printer.

Figure 10:
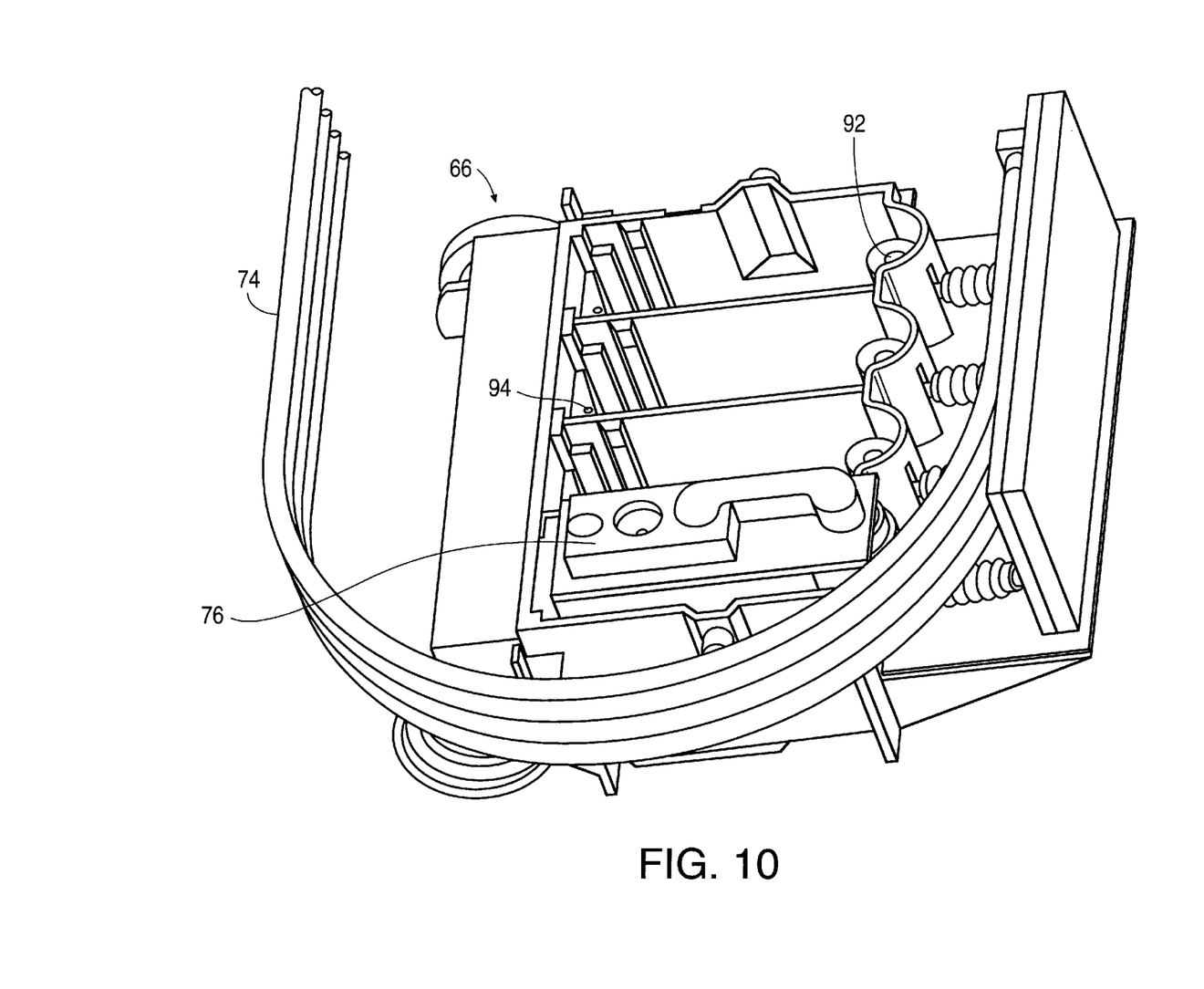
FIG. 10 illustrates a scanning carriage for the print cartridge of FIG. 9.

FIG. 10 illustrates a scanning carriage 66 and the fluid interconnect between an ink supply tube 74 and needle 80 of print cartridge 76. Tube 74, connected to an off-axis ink supply, is in fluid communication with a rubber septum 92.

When the print cartridge 76 is installed in the carriage, a downward force of the fluid interconnect system causes needle 80 to be inserted through a central slit in septum 92. Ink now flows from the off-axis ink supply station, through tube 74, through hollow needle 80, and into the print cartridge's ink chamber.

A portion of the carriage electrodes 94 for contacting terminals 88 are also shown in FIG. 10.

In another embodiment, the print cartridge contains a reservoir of ink and is disposed of once its ink supply is depleted.

Any other types of print cartridges may also be used with the present invention. These print cartridges may be any known print cartridges, some of which are described in U.S. patent application Ser. No. 08/708,143, filed Aug. 30, 1996, HP docket No. 10960238-1, entitled Automatic Ink Interconnect Between Print Cartridge and Carrier, by Norman Pawlowski, Jr. et al., assigned to the present assignee and incorporated herein by reference.

CONCLUSION

A number of embodiments of the present invention have been described. It will be obvious to those skilled in the art that changes and modifications may be made without departing from this invention in its broader aspects and, therefore, the appended claims are to encompass within their scope all such changes and modifications as fall within the true spirit and scope of this invention. For example, the actual ink drop volume associated with a particular print cartridge may be obtained from any source, and the information relating to the ink drop volume need not be specified in terms of ink drop volume. Also, the print cartridge may be permanently installed in the printer or a removable type.

What is claimed is:

1. A method performed for printing with an inkjet printer, said printer including at least one printhead for printing a range of tone values, said at least one printhead for ejecting droplets of ink for printing, said method comprising:

identifying a variance in an ink drop volume by said at least one printhead from a nominal ink drop volume;

compensating one or more first tone values for said variance in said ink drop volume to generate one or more second tone values, wherein said second tone values are generated independent of any halftone error algorithms; and controlling said at least one printhead in accordance with said one or more second tone values such that said one or more first tone values are substantially printed.

2. The method of claim 1 wherein said step of identifying comprises reading information from a memory located on a print cartridge containing said at least one printhead.

3. The method of claim 2 wherein said step of identifying comprises reading stored information from a memory chip located on said print cartridge.

4. The method of claim 2 wherein said step of identifying comprises reading information from said memory located on said print cartridge which identifies an actual ink drop volume of an ink drop ejected from said print cartridge.

5. The method of claim 2 wherein said memory has conductive terminals, and wherein said conductive terminals contact electrodes in a scanning carriage in which said print cartridge is installed.

6. The method of claim 1 wherein said step of compensating comprises:

reading original color tone level values from a look-up table;

modifying said original color tone level values from said table, to create modified color tone level values, to compensate for said variance in said ink drop volume; and storing said modified color tone level values in a look-up table.

7. The method of claim 6 wherein said printer is connected to a computer, said method further comprising:

indexing said table containing said modified color tone level values by red, green and blue (RGB) tone level values generated by said computer connected to said printer; and further processing indexed ones of said modified color tone level values to generate energizing signals for said at least one printhead to eject droplets of ink, said energizing signals being generated in accordance with said indexed ones of said modified color tone level values.

8. The method of claim 7 wherein said further processing comprises halftoning said indexed ones of said modified color tone level values such that said modified color tone level values are printed on a medium by said printer using primary color inks ejected by said at least one printhead.

9. The method of claim 6 further comprising:

calculating an ideal ink volume in an area for an original color tone level value from said look-up table, assuming a nominal ink drop volume;

calculating a compensated ink volume for said area which, when modified by said variance in said ink drop volume, yields said ideal ink volume for said area;

identifying a color tone level value which best corresponds to said compensated ink volume to obtain a compensated color tone level value; and using said compensated color tone level value in place of said original color tone level value when converting colors generated by a computer to colors to be printed by said printer.

10. The method of claim 6 wherein said look-up table is implemented in software.

11. The method of claim 6 wherein said look-up table is implemented in hardware.

12. The method of claim 1 wherein said at least one printhead includes a first printhead in a first print cartridge for printing cyan ink, a second printhead in a second print cartridge for printing magenta ink, and a third printhead in a third print cartridge for printing yellow ink.

13. The method of claim 12 wherein said at least one printhead further comprises a fourth printhead in a fourth print cartridge for printing black ink.

14. The method of claim 1 wherein said at least one printhead is located in a print cartridge, said method further comprising the step of:

testing said print cartridge to determine an ink drop volume in an ink droplet ejected from said at least one printhead; and storing information corresponding to said ink drop volume in a memory for being accessed during said step of identifying said variance.

15. A printing apparatus comprising:

a print cartridge containing an inkjet printhead, said print cartridge having a memory device, said memory device containing information regarding an ink drop volume by said printhead;

said printing apparatus being controlled to carry out the following steps:

identifying a variance in an ink drop volume by said at least one printhead from a nominal ink drop volume;

compensating one or more first tone values for said variance in said ink drop volume to generate one or more second tone values, wherein said second tone values are generated independent of any halftone error algorithms; and transmitting signals corresponding to said second tone values to said printer.

16. The apparatus of claim 15 wherein said memory contains information conveying an ink drop volume by said printhead.

17. The apparatus of claim 15 wherein said memory is a memory chip affixed to said print cartridge.

18. The apparatus of claim 15 further comprising:

a printer;

a scanning carriage in said printer supporting said print cartridge, said scanning carriage having one or more electrodes contacting terminals on said print cartridge, said terminals being electrically connected to said memory to allow a reading of said memory by said printer.

19. The apparatus of claim 18 further comprising a computer connected to said printer.

20. The apparatus of claim 19 wherein said computer is programmed to carry out the following steps:

identifying a variance in an ink drop volume by said printhead in said print cartridge from a nominal ink drop volume;

compensating one or more first tone values for said variance in said ink drop volume to generate one or more modified second tone values; and transmitting signals corresponding to said modified second tone values to said printer such that when said printer is controlled in accordance with said signals corresponding to said modified second tone values, said print cartridge prints said one or more first tone values.

21. The apparatus of claim 20 wherein said programmed computer further carries out the following steps:

processing said one or more modified second tone values to generate halftone and error diffusion data for being transmitted to said printer.

22. A computer connected to a printer, said printer including at least one printhead for printing a range of tone values, said at least one printhead for ejecting droplets of ink for printing, said computer being programmed to carry out the steps of:

identifying a variance in an ink drop volume by said at least one printhead from a nominal ink drop volume;

compensating one or more first tone values for said variance in said ink drop volume to generate one or more second tone values, wherein said second tone values are generated independent of any halftone error algorithms; and issuing signals to said printer for printing said one or more second tone values, whereby said printer substantially prints said one or more first tone values due to said variance in said ink drop volume by said at least one printhead from said nominal ink drop volume.

23. A method performed for printing with and inkjet printer, said printer including at least one printhead for printing a range of tone values, said at least one printhead for ejecting droplets of ink for printing, said method comprising:

identifying a variance in an ink drop volume by said at least one printhead from a nominal ink drop volume;

applying first color values to a color matching look-up table;

compensating for said variance in said ink drop volume by controlling said color matching look-up table to take into account said variance;

generating compensated second tone values; and controlling said at least one printhead in accordance with said second tone values such that colors substantially matching said first tone values are printed.

* * * * *